Figure 1:
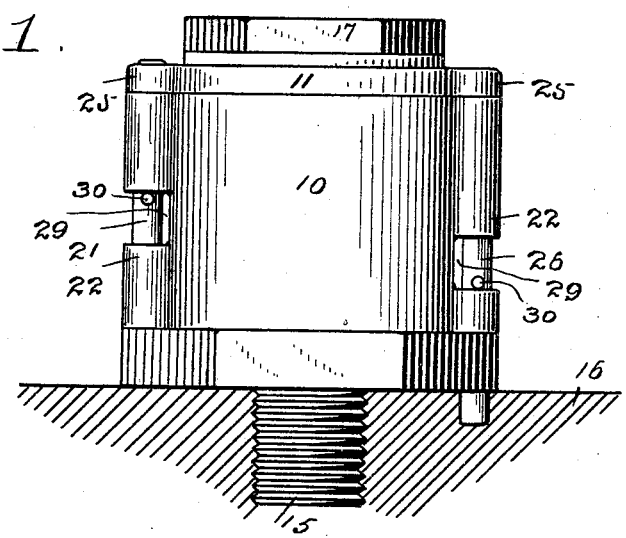

No. 787,466. PATENTED APR. 18, 1905.
R. J. PREECE.
OIL CUP FOR QUICK MOVING BEARINGS.
APPLICATION FILED OCT. 5, 1904.

WITNESSES:
H. A. Lamb.
A. M. Brennan.

INVENTOR
Richard J. Preece
BY
A. M. Wooster
ATTORNEY

No. 787,466. Patented April 18, 1905.

UNITED STATES PATENT OFFICE.

RICHARD J. PREECE, OF ANSONIA, CONNECTICUT.

OIL-CUP FOR QUICK-MOVING BEARINGS.

SPECIFICATION forming part of Letters Patent No. 787,466, dated April 18, 1905.

Application filed October 5, 1904. Serial No. 227,225.

*To all whom it may concern:*

Be it known that I, RICHARD J. PREECE, a citizen of the United States, residing at Ansonia, county of New Haven, State of Connecticut, have invented a new and useful Oil-Cup for Quick-Moving Bearings, of which the following is a specification.

My invention has for its object to provide an oil-cup adapted for use on machine and engine bearings generally and especially adapted for use upon quick-motion bearings, as upon the crank-bearings of locomotives.

It is of course well understood that upon locomotives, especially when in use drawing fast trains, the jar upon the crank-shafts and other portions of the machine is very great and is apt to cause the caps or covers of the oil-cups to become detached and lost and frequently to cause the oil-cups themselves to become detached and lost. This is a serious inconvenience, as it frequently results in hot bearings and causes serious loss of time when time is all-important. It also causes serious expense through the loss of oil in the cups and oil that must be put on the bearings before other cups are procured. Not infrequently hot bearings resulting from the loss of oil-cups require that a locomotive be withdrawn from service and repaired at considerable expense, as the bearings have to be taken apart and new bushings provided, which necessitates considerable expense and loss of time. My present invention wholly overcomes these objections and enables me to provide oil-cups that are simple and inexpensive to produce, neat and attractive in appearance, can be readily attached to or detached from a bearing, from which the caps or covers may be readily removed and replaced, which will wholly prevent the loss of oil, and thus prevent hot bearings so long as the cups are kept filled, which cannot be detached in use, and from which the caps or covers cannot be detached in use. With these and other objects in view I have devised the novel oil-cup of which the following description, in connection with the accompanying drawings, is a specification, reference characters being used to indicate the several parts.

Figure 2:
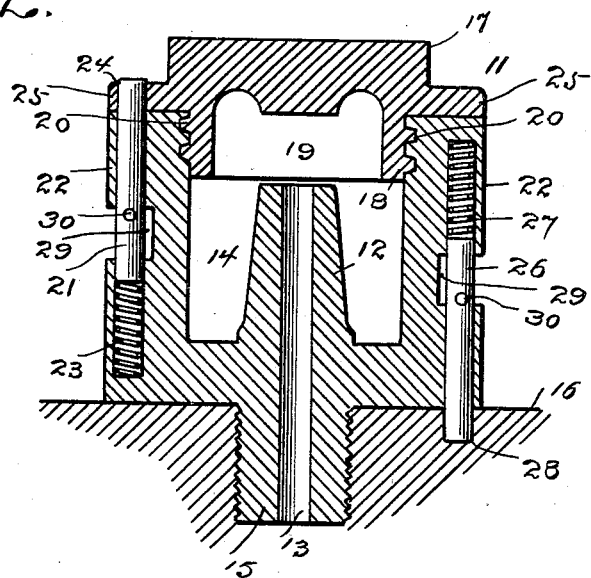

Figure 1 is an elevation of my novel oil-cup with the cap or cover thereon and attached in position ready for use, the part to which the oil-cup is attached being shown in section; and Fig. 2 is a central section corresponding therewith.

10 denotes the body of my novel oil-cup, and 11 the cap or cover. The body is shown as provided with the usual central hub 12, having an oil-duct 13 and surrounding the hub the usual reservoir 14 to receive oil. Upon the under side of the body is the usual threaded hub 15, by which it is attached in place, the part to which the oil-cup is attached being indicated by 16. The top of the cap or cover is provided with the usual polygonal portion 17 to receive a wrench or other tool in attaching it in place. The under side of the cup is provided with a threaded hub 18, ordinarily provided with a recess 19. In practice I provide the exterior of hub 18 with a quick thread, two threads only in the present instance, which are indicated by 20 and which engage corresponding threads on the inner side of the body. This enables me to make practically an instantaneous attachment or detachment of the cap or cover and saves considerable time, as the caps of oil-cups have usually heretofore as a measure of safety been provided with sixteen, more or less, threads to the inch. As a means of locking the cap or cover to the body and preventing its detachment in use I provide a locking-bolt 21, socketed in a housing 22 upon one side of the body. This locking-bolt is normally thrown upward by a spring 23, socketed in the base of the housing, and the upper end of the bolt engages a socket 24 in the cap or cover. In the present instance I have shown the cap or cover as provided with bosses or projections 25, which correspond with and are adapted to register with the housings, one of these bosses being shown as provided with a socket 24 to receive the upper end of locking-bolt 21. It will of course be understood, however, that the special configuration and details of the construction of the parts are wholly unimportant so far as the principle of the invention is concerned. As a means for locking the oil-cup in place upon a bearing and preventing its detachment in use I provide a similar locking-bolt 26 in a housing 22 upon the opposite side of the body. Locking-bolt 26 is normally thrown downward by a spring 27, socketed in the upper portion of the housing, the lower end of the bolt engaging a socket 28 in part 16, to which the oil-cup is attached. The housings are both shown as provided with recesses 29 and the locking-bolts with cross-pins 30 in the recesses for convenience in manipulating the locking-bolts in removing either the cap or cover from the body or the oil-cup as a whole from the part to which it is attached. The cross-pin of locking-bolt 21 normally engages the upper side of the corresponding recess, and the cross-pin of locking-bolt 26 normally engages the under side of the corresponding recess. Both cross-pins limit the movement of the bolt by which they are carried in both directions.

To remove the cap or cover from the body, the operator, by means of the cross-pin, moves locking-bolt 21 downward until it is disengaged from the socket in the cap and then turns the cap backward to detach it, two turns only being required to detach it in the present instance. To reattach the cap, the locking-bolt is moved downward, the cap turned to place, and then the locking-bolt is released and allowed to engage the socket. To remove the oil-cup as a whole from the part to which it is attached, the operator lifts locking-bolt 26 by means of the cross-pin and then turns the oil-cup backward to detach it. To reattach it, he simply raises the locking-bolt, turns the oil-cup to place, and then releases the locking-bolt and allows it to engage the socket. It will then be impossible to remove the oil-cup until the locking-bolt is again lifted, which cannot occur under the ordinary or even the extraordinary conditions of use.

Having thus described my invention, I claim—

1. An oil-cup comprising a body having a threaded hub for engagement with a bearing, housings, and spring-actuated locking-bolts in said housings and a cap threaded to engage the body and having a socket to receive the forward end of one of the locking-bolts, the forward end of the other locking-bolt being adapted to engage the bearing to lock the oil-cup in place.

2. An oil-cup comprising a body having means for attachment to a bearing, a cap having means for attachment to the body and provided with a socket, housings upon the body and spring-actuated locking-bolts in the housings, one of said locking-bolts being normally thrown upward to engage its end in the socket in the cap and the other normally thrown downward to engage its end with the bearing by which the oil-cup is carried.

In testimony whereof I affix my signature in presence of two witnesses.

RICHARD J. PREECE.

Witnesses:
JOHN W. KELLY,
THEO. D. L. MANVILLE.